(12) United States Patent
Treinen et al.

(10) Patent No.: US 10,464,600 B2
(45) Date of Patent: *Nov. 5, 2019

(54) FOUR WHEEL STEERING WITH REAR MOUNTED CONTROL VALVES

(71) Applicant: CNH Industrial America LLC, New Holland, PA (US)

(72) Inventors: Kerry J. Treinen, Malone, WI (US); Blaine A. Schwalbe, Valders, WI (US); Nathan P. Brooks, Manitowoc, WI (US); Roy A. Bittner, Cato, WI (US); Steven N. Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/593,690

(22) Filed: May 12, 2017

(65) Prior Publication Data
US 2018/0327025 A1 Nov. 15, 2018

(51) Int. Cl.
| | | |
|---|---|---|
| *B62D 17/00* | (2006.01) | |
| *B62D 7/14* | (2006.01) | |
| *B62D 5/20* | (2006.01) | |
| *B62D 5/06* | (2006.01) | |
| *B62D 7/15* | (2006.01) | |

(52) U.S. Cl.
CPC .............. *B62D 7/142* (2013.01); *B62D 5/06* (2013.01); *B62D 5/20* (2013.01); *B62D 7/1509* (2013.01); *B60Y 2200/22* (2013.01)

(58) Field of Classification Search
CPC .......... B62D 7/142; B62D 5/091; B62D 5/20; B60Y 2200/22

USPC ................. 180/408, 410–417, 421–423, 441
See application file for complete search history.

(56) References Cited

U.S. PATENT DOCUMENTS

| | | | |
|---|---|---|---|
| 3,631,833 A | 1/1972 | Shimanckas | |
| 3,856,102 A | 12/1974 | Queen | |
| 4,316,519 A | 2/1982 | Taig | |
| 4,595,370 A | 6/1986 | Small | |
| 4,744,777 A | 5/1988 | Ferguson | |
| 4,933,617 A | 6/1990 | Huber et al. | |
| 5,020,627 A * | 6/1991 | Wittke | B62D 7/142 180/234 |
| 5,194,851 A * | 3/1993 | Kraning | B62D 7/1509 180/415 |
| 5,217,083 A * | 6/1993 | Bachhuber | B62D 7/1509 180/415 |
| 5,238,077 A * | 8/1993 | Vaughn | B62D 7/159 180/415 |

(Continued)

*Primary Examiner* — Tony H Winner
(74) *Attorney, Agent, or Firm* — Rebecca J. Henkel; Rickard K. DeMille (57) ABSTRACT

Electronically controlled hydraulic valves can be directly mounted to rear steering cylinders of a four wheel steering machine to improve steering, reduce space consumption, reduce leak points and allow ease of routing. The valves can receive hydraulic fluid from a pump and release hydraulic fluid to tank, while controlling an amount of hydraulic fluid to the steering cylinder via inlets and outlets in direct contact. The valves can be controlled by a controller that is also in communication with position sensors configured to sense positions of the front and rear steering cylinders, so that the directly mounted valves in the rear can be correspondingly controlled to follow steering in the front.

20 Claims, 5 Drawing Sheets

(56) References Cited

U.S. PATENT DOCUMENTS

| | | | |
|---|---|---|---|
| 5,330,739 A * | 7/1994 | Illig | C07C 233/54 |
| | | | 424/9.45 |
| 5,427,045 A | 6/1995 | Fetchko | |
| 6,464,030 B1 * | 10/2002 | Hanagan | B62D 7/142 |
| | | | 180/211 |
| 6,500,037 B1 * | 12/2002 | Hedlund | B63H 25/30 |
| | | | 114/150 |
| 6,513,548 B2 | 2/2003 | Baptista et al. | |
| 6,896,092 B2 | 5/2005 | Stall | |
| 7,191,865 B2 | 3/2007 | Spark | |
| 7,699,674 B1 | 4/2010 | Wald et al. | |
| 8,651,223 B2 | 2/2014 | Mergener | |
| 9,550,527 B2 | 1/2017 | Brooks | |
| 2006/0027411 A1 * | 2/2006 | Bordini | B60G 3/145 |
| | | | 180/253 |
| 2007/0051554 A1 * | 3/2007 | Thacher | B60T 8/1755 |
| | | | 180/423 |
| 2016/0096550 A1 * | 4/2016 | Dames | B62D 7/142 |
| | | | 180/252 |
| 2016/0227698 A1 | 8/2016 | Ballu | |
| 2016/0297474 A1 | 10/2016 | Shi | |

* cited by examiner

FOUR WHEEL STEERING WITH REAR MOUNTED CONTROL VALVES

FIELD OF THE INVENTION

The invention relates generally to agricultural product application equipment such as self-propelled sprayers and, in particular, to a steering assembly for an agricultural machine in which electronically controlled valves that are operable to hydraulically adjust rear wheel steering cylinders are directly mounted to the steering cylinders without interconnecting hydraulic hoses in between.

BACKGROUND OF THE INVENTION

Agricultural machines such as high-clearance sprayers are getting larger and more complex, with some sprayers having four-wheel steering to improve maneuverability, such as when making tight turns in a field's headlands. Such four-wheel steering systems typically have a controller that electronically controls a single steering valve which meters hydraulic fluid to both hydraulic rear-steering cylinders to correspond to a front-steering input. However, this shared steering valve for controlling both rear-steering cylinders can require cumbersome hydraulic hoses or lines. Such hydraulic hoses have to interconnect the shared steering valve to each of the steering cylinders, as well as to the underlying hydraulic circuit's pressure and tank lines, which can consume substantial space and cause difficulty to route. A need therefore exists for an improved system which eliminates one or more of the foregoing disadvantages.

SUMMARY OF THE INVENTION

Electronically controlled hydraulic valves can be directly mounted to rear steering cylinders of a four wheel steering machine to improve steering, reduce space consumption, reduce leak points and allow ease of routing. The valves can receive hydraulic fluid from a pump and release hydraulic fluid to tank, while controlling an amount of hydraulic fluid to the steering cylinder via inlets and outlets in direct contact. The valves can be controlled by a controller that is also in communication with position sensors configured to sense positions of the front and rear steering cylinders, so that the directly mounted valves in the rear can be correspondingly controlled to follow steering in the front.

In one aspect, each rear-steering joint system can include a steering-cylinder assembly with a steering cylinder and a steering-control valve. The steering control valve can be connected directly to the steering cylinder, without any intervening hydraulic lines. Moreover, such hydraulic system can also incorporate a locking assembly which can include an actuator mounted to a swing arm that drives a lock cylinder or block into a yoke or pocket on a wheel support arm in a locking position. Supporting such various features in a common hydraulic system can eliminate the need for separate components, such as hoses, blocks and the like.

Accordingly, directly mounting the steering-control valve directly to the steering cylinder eliminates hydraulic lines. This can simplify installation and maintenance and provide fewer potential leak points. The combined steering cylinder and steering control valve can provide an efficient steering unit at each steering joint.

Specifically then, one aspect of the present invention can provide a steering assembly for an agricultural machine including: a swing arm configured to move with respect to a chassis; a steerable leg coupled to the swing arm, the steerable leg being configured to move with respect to the swing arm and being configured to receive a wheel assembly; a steering cylinder coupled to the swing arm and the steerable leg, the steering cylinder being configured to control movement between the swing arm and the steerable leg for steering the wheel assembly; and an electronically controlled valve operable to hydraulically adjust the steering cylinder to control the movement for steering the wheel assembly. The electronically controlled valve can be directly mounted to the steering cylinder without an interconnecting hydraulic hose in between the electronically controlled valve and the steering cylinder.

Another aspect of the present invention can provide a four wheel steering system for an agricultural machine including: first and second front steering assemblies, each front steering assembly including: a front swing arm configured to move with respect to a chassis; a front steerable leg coupled to the front swing arm, the front steerable leg being configured to move with respect to the front swing arm and being configured to receive a front wheel assembly; and a front steering cylinder coupled to the front swing arm and the front steerable leg, the front steering cylinder being configured to control movement of the front steerable leg for steering the front wheel assembly; first and second rear steering assemblies, each rear steering assembly including: a rear swing arm configured to move with respect to a chassis; a rear steerable leg coupled to the swing arm, the rear steerable leg being configured to move with respect to the rear swing arm and being configured to receive a rear wheel assembly; a rear steering cylinder coupled to the rear swing arm and the rear steerable leg, the rear steering cylinder being configured to control movement between the rear swing arm and the rear steerable leg for steering the rear wheel assembly; and an electronically controlled valve operable to hydraulically adjust the rear steering cylinder to control the movement for steering the rear wheel assembly. The electronically controlled valve can be directly mounted to the rear steering cylinder without an interconnecting hydraulic hose in between the electronically controlled valve and the rear steering cylinder.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
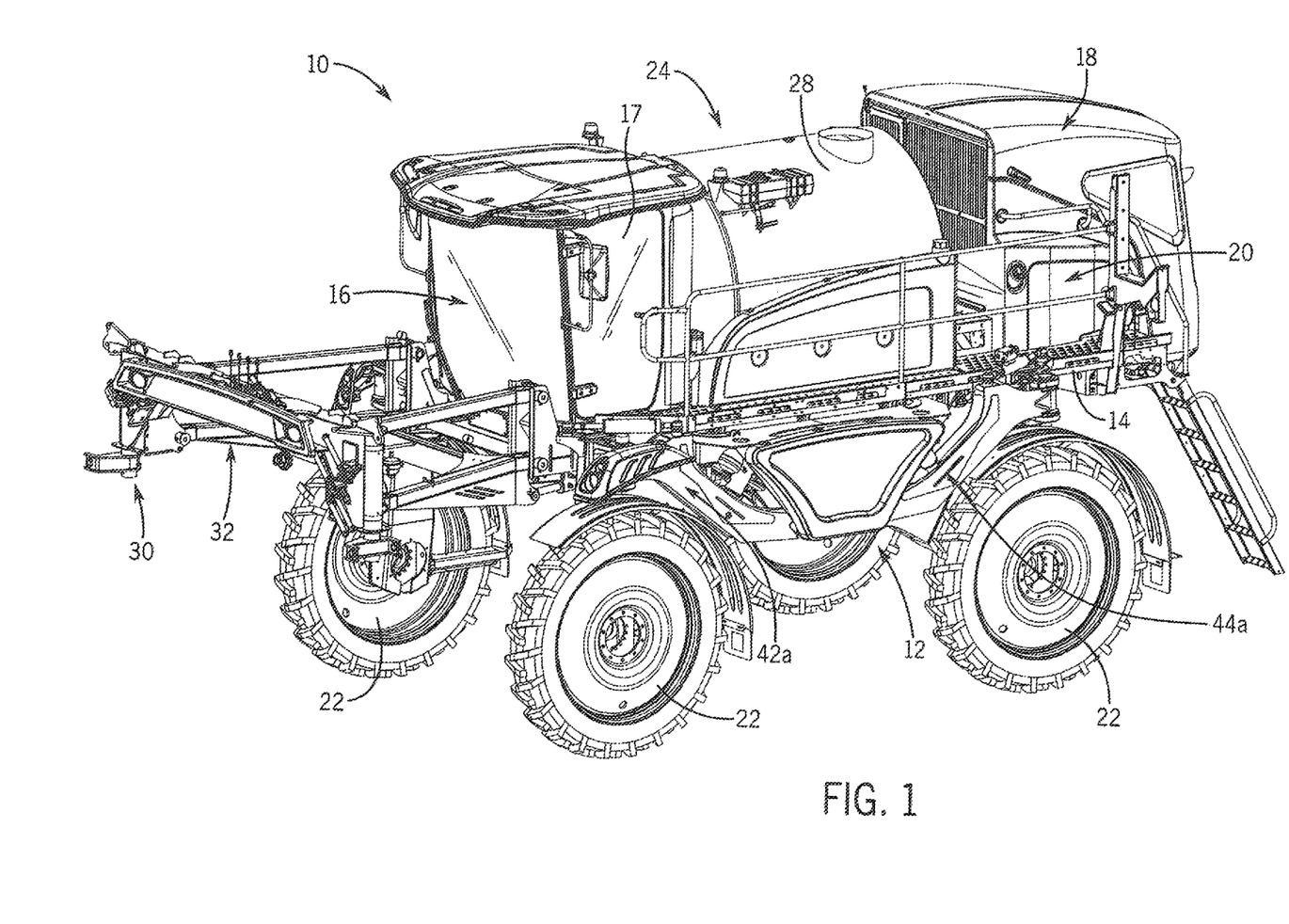
FIG. 1 is an isometric view of an agricultural machine in accordance with an aspect of the invention.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16, a spray system 24, and an engine compartment 17 housing an engine 18 and a hydraulic system 20, among other things. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. The spray system 24 can include storage containers such as rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

The sprayer 10 can operate in a two wheel steering mode or a four wheel steering mode. In the two wheel steering mode, the front wheels can be steered by the operator while the rear wheels are locked straight. The two wheel steering mode can be advantageous for operating at higher speeds and/or rough terrain. However, in the four wheel steering mode, the front and rear wheels can be steered by the operator. The four wheel steering mode can be advantageous for operating at lower speeds and/or tighter turns.

Figure 2:
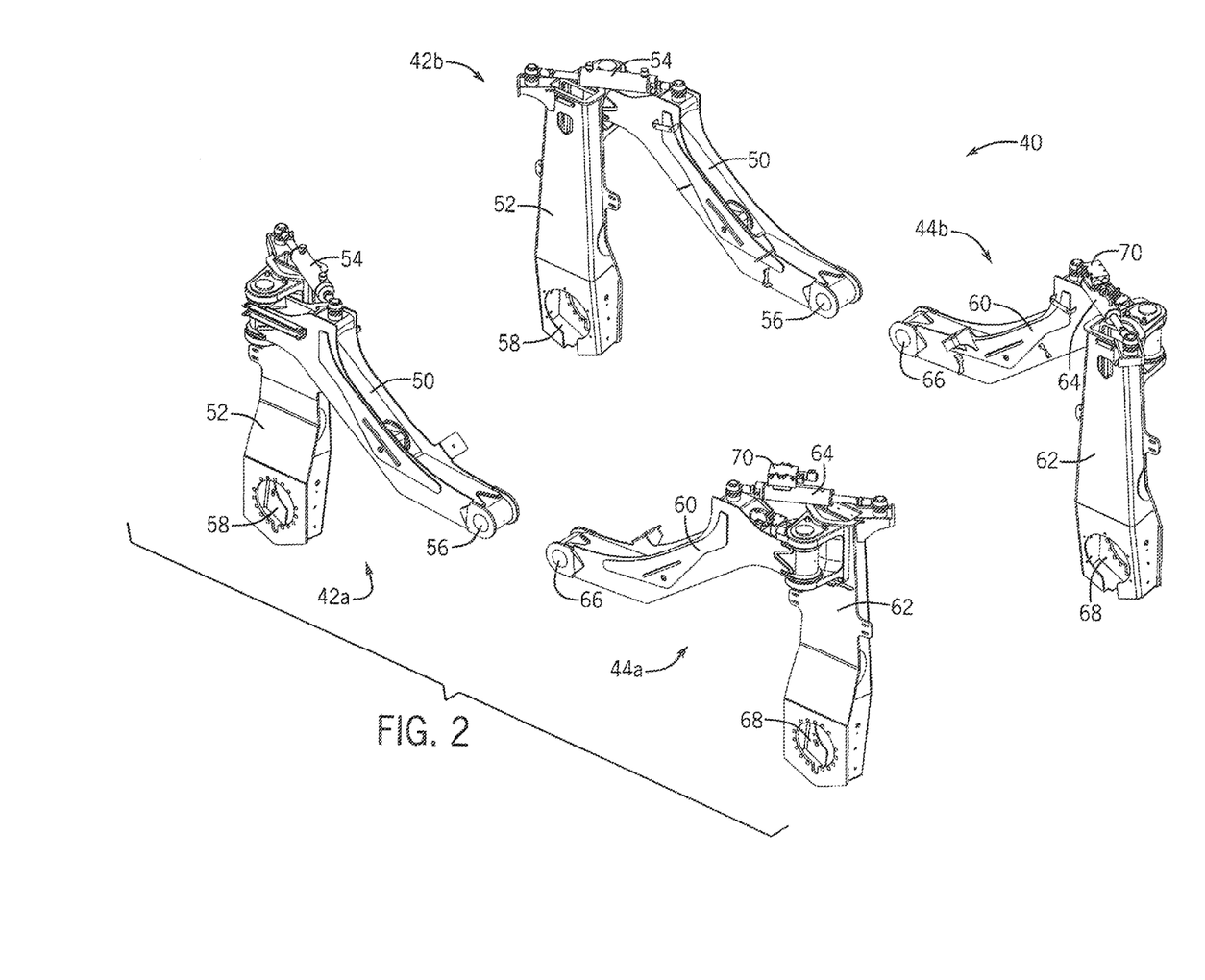
FIG. 2 is an isometric view of a four wheel steering system for the agricultural machine of FIG. 1.

With additional reference to FIG. 2, a four wheel steering system 40 for the sprayer 10 can include first and second front steering assemblies 42a and 42b, respectively, and first and second rear steering assemblies 44a and 44b, respectively. Each front steering assembly 42 can include: a front swing arm 50, a front steerable leg 52, and a front steering cylinder 54, among other things. The front swing arm 50 can be configured to move with respect to the chassis 12, such as by rotating vertically (up or down) with respect to the ground, at a front swing arm chassis connection point 56. The front steerable leg 52 can be coupled to the front swing arm 50 and can be configured to move with respect to the front swing arm 50, such as by rotating horizontally (left or right) with respect to the ground, as will be further described below. The front steerable leg 52 can also be configured to receive a front wheel assembly, such as a wheel 22, at a front wheel assembly connection point 58. The front steering cylinder 54 can be coupled to the front swing arm 50 and the front steerable leg 52, so that the front steering cylinder 54 can control movement of the front steerable leg 52 for steering the wheel 22 at the front wheel assembly connection point 58 and, in turn, for steering the sprayer 10.

Similarly, each rear steering assembly 44 can include: a rear swing arm 60, a rear steerable leg 62, and a rear steering cylinder 64, among other things. The rear swing arm 60 can also be configured to move with respect to the chassis 12, such as by rotating vertically (up or down) with respect to the ground, at a rear swing arm chassis connection point 66. The rear steerable leg 62 can be coupled to the rear swing arm 60 and can be configured to move with respect to the rear swing arm 60, such as by rotating horizontally (left or right), with respect to the ground, as will be further described below. The rear steerable leg 62 can also be configured to receive a rear wheel assembly, such as a wheel 22, at a rear wheel assembly connection point 68. The rear steering cylinder 64 can be coupled to the rear swing arm 60 and the rear steerable leg 62, so that the rear steering cylinder 64 can control movement of the rear steerable leg 62 for steering the wheel 22 at the rear wheel assembly connection point 68 and, in turn, for steering the sprayer 10.

Figure 5:
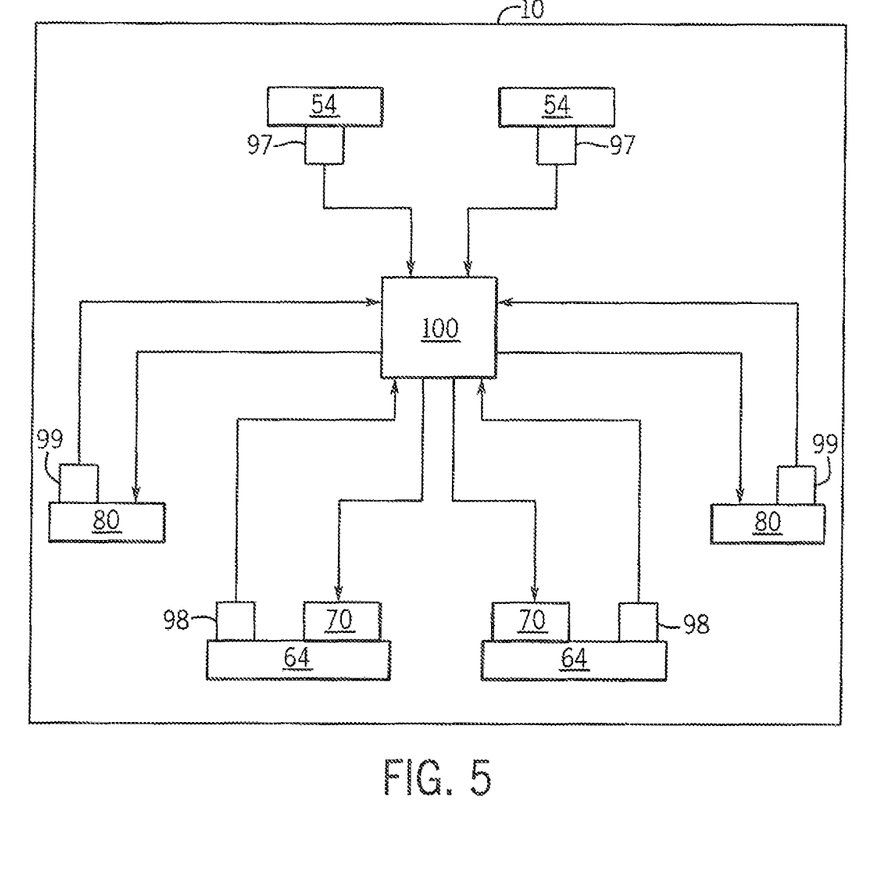
FIG. 5 is a block diagram illustrating electronic control for the four wheel steering system of FIG. 2.

An electronically controlled valve 70 can be directly mounted to the rear steering cylinder 64 for controlling the rear steering cylinder 64 (see also FIG. 5). The electronically controlled valve 70 can be advantageously mounted directly to the rear steering cylinder 64 without any interconnecting hydraulic hoses in between the electronically controlled valve 70 and the rear steering cylinder 64 by using directly attached inlets/outlets 72 (see FIG. 3). Accordingly, the electronically controlled valve 70 can be controlled by a controller 100 (see FIG. 5) to hydraulically adjust the rear steering cylinder 64 to control the movement for steering the wheel 22 at the rear wheel assembly connection point 68.

Figure 3:
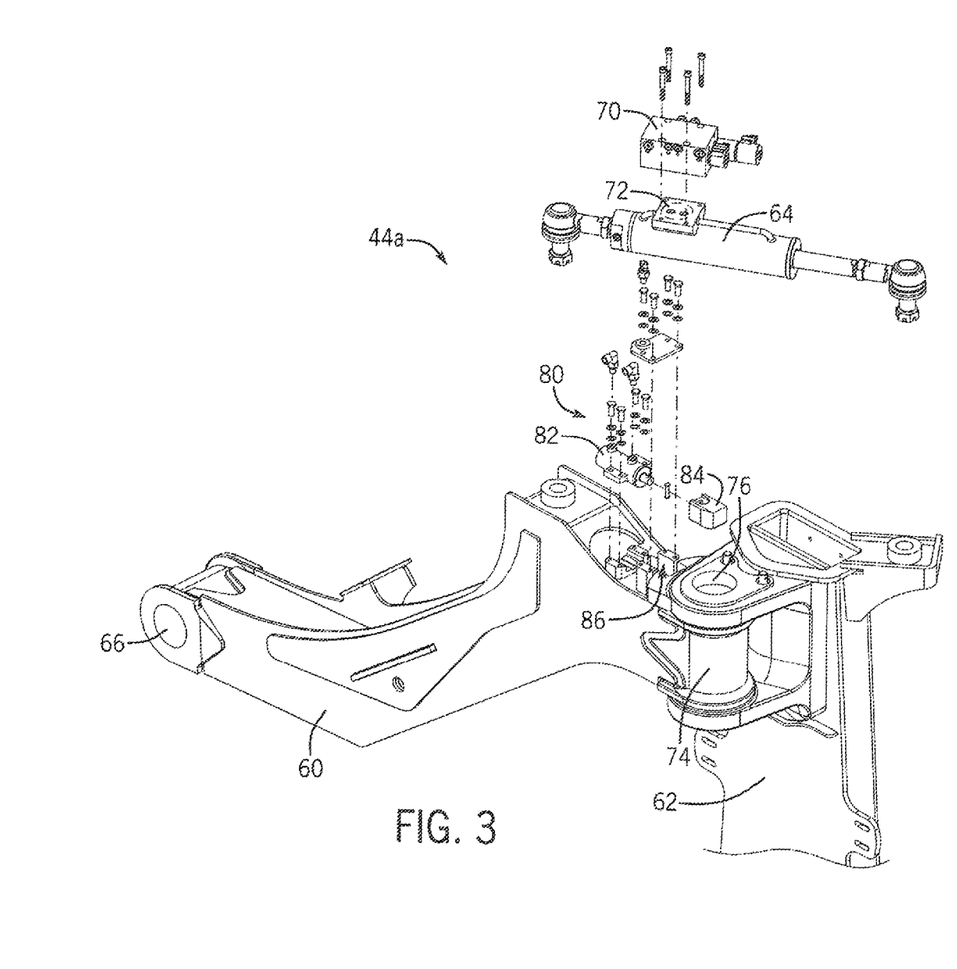
FIG. 3 is an exploded isometric view of a rear steering assembly in the four wheel steering system of FIG. 2.

With additional reference to FIG. 3, an exploded isometric view of an exemplar rear steering assembly 44, such as the first rear steering assembly 44a, is provided in accordance with an aspect of the invention. A lock assembly 80 can be provided in each rear steering assembly 44 to be in communication with the rear steerable leg 62, so as to lock the rear steerable leg 62 in a first state which prevents the rear steerable leg 62 from moving with respect to the rear swing arm 60, or unlock the rear steerable leg 62 in a second state which allows the rear steerable leg 62 to move with respect to the rear swing arm 60. The lock assembly 80 can include an actuator 82, which can be mounted directly to the rear swing arm 60, and a lock cylinder 84, which can be hydraulically driven by the actuator 82. The rear steerable leg 62 can provide a pocket 86 that is axially aligned with the actuator 82 and a path of the lock cylinder 84. Accordingly, the actuator 82 can be electronically controlled by the controller 100 (see FIG. 5) to hydraulically drive the lock cylinder 84 into the pocket 86 in the first state to lock the rear steerable leg 62 to prevent rear steering, or hydraulically retract the lock cylinder 84 from the pocket 86 in the second state to unlock the rear steerable leg 62 to allow steering.

In one aspect, the swing arms and steerable legs of the front and rear steering assemblies 42 and 44, respectively, can be coupled using clevis fasteners. By way of example, with respect to the first rear steering assembly 44*a*, an end 74 of the rear swing arm 60 can be configured as a clevis, and the rear steerable leg 62 can include a hole or opening 76 for receiving a king pin for fastening the clevis.

Figure 4:
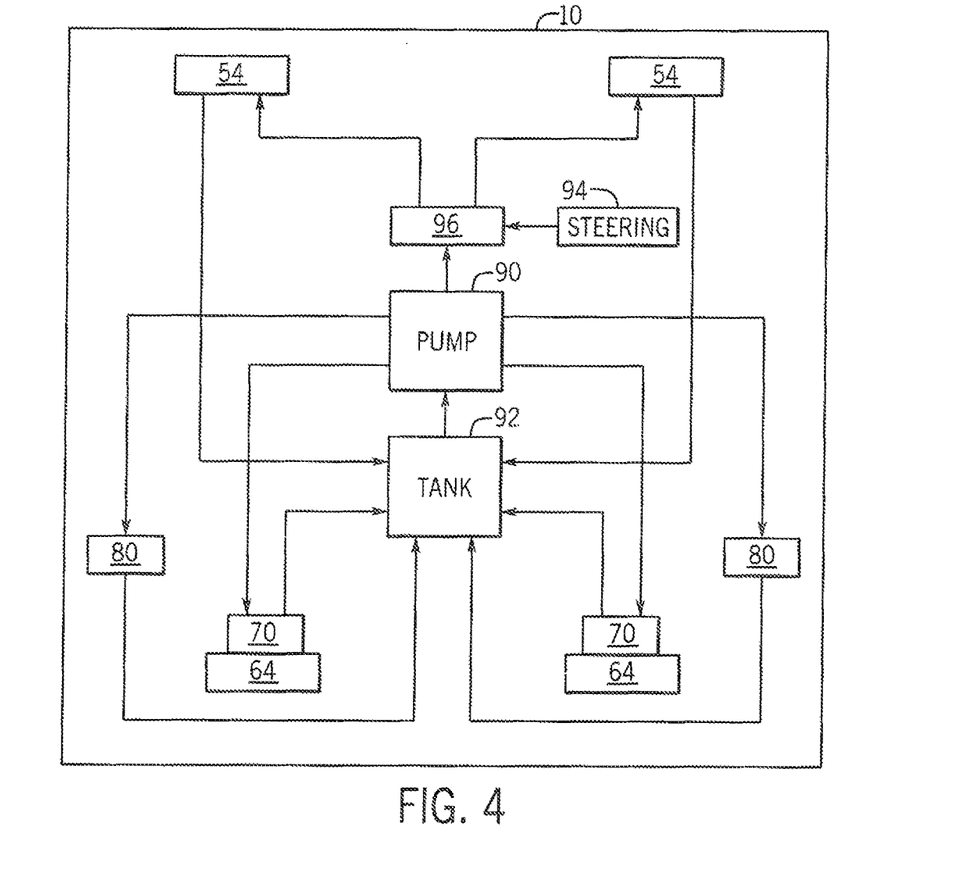
FIG. 4 is a block diagram illustrating hydraulic control for the four wheel steering system of FIG. 2.

With additional reference to FIGS. 4 and 5 together, a block diagram illustrating hydraulic control for the steering system 40 (FIG. 4), and a block diagram illustrating electronic control for the steering system 40 (FIG. 5), are provided in accordance with an aspect of the invention. Turning initially to FIG. 4, a pump 90 can draw hydraulic fluid from tank 92 for providing to various hydraulic valves in the system. For steering the first and second front steering assemblies 42*a* and 42*b*, respectively, whether in a two-wheel steering mode or a four-wheel steering mode, an operator can provide steering input, such as by way of a steering wheel, joystick, or other steering device 94, to a front hydraulic valve 96, which can be an orbital valve as known in the art. The front hydraulic valve 96, in turn, can provide hydraulic fluid driven from the pump 90 to the front steering cylinders 54 of the first and second front steering assemblies 42*a* and 42*b*, respectively, for steering the sprayer 10. The front steering cylinders 54 can, in turn, return hydraulic fluid to the tank 92.

For example, to steer to the left, the front steering cylinder 54 of the first front steering assembly 42*a* can receive more hydraulic fluid to allow a piston (in the front steering cylinder 54 of the first front steering assembly 42*a*) to push the front steerable leg 52 (of the first front steering assembly 42*a*) to the left, while the front steering cylinder 54 of the second front steering assembly 42*b* can release hydraulic fluid to the tank 92 to allow a piston (in the front steering cylinder 54 of the second front steering assembly 42*b*) to pull the front steerable leg 52 (of the second steering assembly 42*b*) to the left. Conversely, to steer to the right, the front steering cylinder 54 of the first front steering assembly 42*a* can release hydraulic fluid to the tank 92 to allow the piston (in the front steering cylinder 54 of the first front steering assembly 42*a*) to pull the front steerable leg 52 (of the first front steering assembly 42*a*) to the right, while the front steering cylinder 54 of the second front steering assembly 42*b* can receive more hydraulic fluid to allow the piston (in the front steering cylinder 54 of the second front steering assembly 42*b*) to push the front steerable leg 52 (of the second steering assembly 42*b*) to the right.

Turning also to FIG. 5, the front steering cylinders 54 can each include front steering position sensors 97 configured to sense positions of the front steering cylinder 54 of the first and second front steering assemblies 42*a* and 42*b*, respectively. The front steering position sensors 97 can be embedded cylinder position sensors operable to provide direct stroke measurements of the front steering cylinders 54 to a controller 100, which could be a microprocessor, a microcontroller or other programmable logic element configured to execute a program stored in a non-transient medium as known the art.

In the two-wheel steering mode, the rear steering cylinders 64 of the first and second rear steering assemblies 44*a* and 44*b*, respectively, can be controlled to remain in a fixed position. The fixed position would typically be for the rear steerable legs 62 of the first and second rear steering assemblies 44*a* and 44*b*, respectively, to be straight. However, in alternative aspects, the fixed position could be for the rear steerable legs 62 of the first and second rear steering assemblies 44*a* and 44*b*, respectively, to be at a common angle. In one aspect, the fixed position for the first and second rear steering assemblies 44*a* and 44*b*, respectively, can be achieved by providing, releasing and/or locking hydraulic fluid to the rear steering cylinders 64 of the first and second rear steering assemblies 44*a* and 44*b*, respectively, by an amount sufficient to hold the rear steering cylinders 64 in the desired fixed position.

Like the front steering cylinders 54, the rear steering cylinders 64 can each also include rear steering position sensors 98 configured to sense a position of the rear steering cylinders 64 of the first and second rear steering assemblies 44*a* and 44*b*, respectively. The rear steering position sensors 98 can be embedded cylinder position sensors operable to provide direct stroke measurements of the rear steering cylinders 64 to the controller 100. The controller 100, in turn, can monitor the position of the rear steering cylinders 64, in addition to the front steering cylinders 64, to allow the controller 100 to achieve the fixed position with respect to the rear steerable legs 62.

In addition, or alternatively, in the two-wheel steering mode, the lock assemblies 80 of the first and second rear steering assemblies 44*a* and 44*b*, respectively, can be engaged in the first state to lock the rear steerable legs 60 to prevent rear steering. For example, to lock the rear steerable legs 60 in the first state, the actuator 82 can adjust hydraulic fluid between the pump 90 and the tank 92 to allow a piston (in the actuator 82) to push the lock cylinder 84 into the pocket 86. Conversely, to unlock the rear steerable legs 60 in the second state, such as for the four-wheel steering mode, the actuator 82 can adjust hydraulic fluid between the pump 90 and the tank 92 to allow the piston (in the actuator 82) to pull or retract the lock cylinder 84 from the pocket 86.

Accordingly, in one aspect, in the two wheel steering mode, the front steerable legs 52 of the first and second front steering assemblies 42*a* and 42*b*, respectively, can be used to steer the sprayer 10 while the rear steerable legs 62 of the first and second rear steering assemblies 44*a* and 44*b*, respectively, can be held in a fixed position by the rear steering cylinders 64 and/or the lock assemblies 80. However, in the four wheel steering mode, the rear steerable legs 62 of the first and second rear steering assemblies 44*a* and 44*b*, respectively, can be controlled by the controller 100 to substantially correspond to the angle of the front steerable legs 52 of the first and second front steering assemblies 42*a* and 42*b*, respectively.

For example, the controller 100 can determine first and second positions corresponding to the front steerable legs 52 of the first and second front steering assemblies 42*a* and 42*b*, respectively, from the front steering position sensor 97. The controller 100 can then control the electronically controlled valve 70 of the first rear steering assembly 44*a* to hydraulically adjust the rear steering cylinder 64 of the first rear steering assembly 44*a* to a position corresponding to the front steering cylinder 54 of the first front steering assembly 42*a*. The position of the rear steering cylinder 64 of the first rear steering assembly 44*a* can be monitored and corrected by the controller 100 in a first closed loop control system. In addition, the controller 100 can control the electronically controlled valve 70 of the second rear steering assembly 44*b* to hydraulically adjust the rear steering cylinder 64 of the second rear steering assembly 44*b* to a position corresponding to the front steering cylinder 54 of the second front steering assembly 42*b*. The position of the rear steering cylinder 64 of the second rear steering assembly 44*b* can also be monitored and corrected by the controller 100 in a second closed loop control system. As a result, the controller can control the electronically controlled valves 70 of the first and second rear steering assemblies 44a and 44b, respectively, independently from one another, to effectively four wheel steer the sprayer 10.

The lock assemblies 80 of the first and second rear steering assemblies 44a and 44b, respectively, can each includes a lock sensor 99 configured to sense the lock cylinder 84 driven into the pocket 86 in the first state and/or the lock cylinder 84 retracted from the pocket 86 in the second state. In one aspect, the lock sensors 99 could be pressure sensors configured with respect to the actuator 82 and/or the pocket 86 to actuate upon contact. In another aspect, the lock sensors 99 could be Hall effect sensors configured with respect to the actuator 82 and/or the pocket 86 to detect proximity of the lock cylinder 84. The controller 100, in turn, can monitor the lock assemblies 80 via the lock sensors 99.

Accordingly, the controller 100 can control the actuators 82 to drive the lock cylinders 84 into the pockets 86 in the first state (locked) in the two wheel steering mode. Moreover, the controller 100 can control the actuators 82 to drive the lock cylinders 84 into the pockets 86 in the first state (locked) when a difference between the positions of front steering assemblies, sensed by the front steering position sensors 97, and the positions of rear steering assemblies, sensed by the rear steering position sensors 98, exceeds a threshold.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A steering assembly for an agricultural machine comprising:
    a swing arm configured to move with respect to a chassis;
    a steerable leg coupled to the swing arm, the steerable leg being configured to move with respect to the swing arm and being configured to receive a wheel assembly;
    a steering cylinder coupled to the swing arm and the steerable leg, the steering cylinder being configured to control movement between the swing arm and the steerable leg for steering the wheel assembly; and
    an electronically controlled valve operable to hydraulically adjust the steering cylinder to control the movement for steering the wheel assembly, wherein the electronically controlled valve is directly mounted to the steering cylinder without an interconnecting hydraulic hose in between the electronically controlled valve and the steering cylinder;
    wherein the steering cylinder includes a position sensor configured to sense a position of the steering cylinder.

2. A steering assembly for an agricultural machine comprising:
    first and second rear steering assemblies, each of the first and second rear steering assemblies including:
        a swing arm configured to move with respect to a chassis;
        a steerable leg coupled to the swing arm, the steerable leg being configured to move with respect to the swing arm and being configured to receive a wheel assembly;
        a steering cylinder coupled to the swing arm and the steerable leg, the steering cylinder being configured to control movement between the swing arm and the steerable leg for steering the wheel assembly; and
        an electronically controlled valve operable to hydraulically adjust the steering cylinder to control the movement for steering the wheel assembly, wherein the electronically controlled valve is directly mounted to the steering cylinder without an interconnecting hydraulic hose in between the electronically controlled valve and the steering cylinder; and
    a controller operatively connected to the electronically controlled valves of the first and second rear steering assemblies, the controller configured to control operation of the electronically controlled valves of the first and second rear steering assemblies independently of each other to effectuate the steering of the wheel assemblies.

3. The steering assembly of claim 2, wherein each of the first and second rear steering assemblies further comprises a lock assembly in communication with the steerable leg, each lock assembly being operable to lock the steerable leg in a first state which prevents the steerable leg from moving with respect to the swing arm, and unlock the steerable leg in a second state which allows the steerable leg to move with respect to the swing arm.

4. The steering assembly of claim 3, wherein each lock assembly comprises an actuator configured to drive a lock pin.

5. The steering assembly of claim 4, wherein each actuator is coupled to the swing arm, the steerable leg provides a pocket, and the actuator is configured to drive the lock pin into the pocket.

6. The steering assembly of claim 5, wherein each actuator is electronically controlled to hydraulically drive the lock pin.

7. The steering assembly of claim 6, wherein each lock assembly includes a lock sensor configured to sense the first state corresponding to the lock pin driven into the pocket or the second state corresponding to the lock pin retracted from the pocket.

8. The steering assembly of claim 2, wherein each swing arm is configured to move by rotating vertically with respect to the chassis.

9. The steering assembly of claim 8, wherein each steerable leg is configured to move by rotating horizontally with respect to the swing arm.

10. The steering assembly of claim 9, wherein an end of each swing arm is configured as a clevis, and wherein each steerable leg includes a hole for receiving a king pin for fastening the clevis.

11. A four wheel steering system for an agricultural machine comprising:
    first and second front steering assemblies, each front steering assembly comprising:
        a front swing arm configured to move with respect to a chassis;
        a front steerable leg coupled to the front swing arm, the front steerable leg being configured to move with respect to the front swing arm and being configured to receive a front wheel assembly; and
        a front steering cylinder coupled to the front swing arm and the front steerable leg, the front steering cylinder being configured to control movement of the front steerable leg for steering the front wheel assembly;
    first and second rear steering assemblies, each rear steering assembly comprising:
        a rear swing arm configured to move with respect to a chassis;

a rear steerable leg coupled to the swing arm, the rear steerable leg being configured to move with respect to the rear swing arm and being configured to receive a rear wheel assembly;

a rear steering cylinder coupled to the rear swing arm and the rear steerable leg, the rear steering cylinder being configured to control movement between the rear swing arm and the rear steerable leg for steering the rear wheel assembly; and an electronically controlled valve operable to hydraulically adjust the rear steering cylinder to control the movement for steering the rear wheel assembly, wherein the electronically controlled valve is directly mounted to the rear steering cylinder without an interconnecting hydraulic hose in between the electronically controlled valve and the rear steering cylinder;

wherein the front and rear steering cylinders each include a position sensor configured to sense a position of the steering cylinder.

12. A four wheel steering system for an agricultural machine comprising:

first and second front steering assemblies, each front steering assembly comprising:
  a front swing arm configured to move with respect to a chassis;
  a front steerable leg coupled to the front swing arm, the front steerable leg being configured to move with respect to the front swing arm and being configured to receive a front wheel assembly; and
  a front steering cylinder coupled to the front swing arm and the front steerable leg, the front steering cylinder being configured to control movement of the front steerable leg for steering the front wheel assembly;

first and second rear steering assemblies, each rear steering assembly comprising:
  a rear swing arm configured to move with respect to a chassis;
  a rear steerable leg coupled to the swing arm, the rear steerable leg being configured to move with respect to the rear swing arm and being configured to receive a rear wheel assembly;
  a rear steering cylinder coupled to the rear swing arm and the rear steerable leg, the rear steering cylinder being configured to control movement between the rear swing arm and the rear steerable leg for steering the rear wheel assembly; and
  an electronically controlled valve operable to hydraulically adjust the rear steering cylinder to control the movement for steering the rear wheel assembly, wherein the electronically controlled valve is directly mounted to the rear steering cylinder without an interconnecting hydraulic hose in between the electronically controlled valve and the rear steering cylinder; and a controller operatively connected to the electronically controlled valves of the first and second rear steering assemblies, the controller configured to control operation of the electronically controlled valves of the first and second rear steering assemblies independently of each other to effectuate the steering of the rear wheel assemblies.

13. The four wheel steering system of claim 12, wherein each rear steering assembly further comprises a lock assembly in communication with the rear steerable leg, the lock assembly being operable to lock the rear steerable leg in a first state which prevents the rear steerable leg from moving with respect to the rear swing arm, and unlock the rear steerable leg in a second state which allows the rear steerable leg to move with respect to the rear swing arm.

14. The four wheel steering system of claim 13, wherein the lock assembly comprises an actuator configured to drive a lock pin.

15. The four wheel steering system of claim 14, wherein the actuator is coupled to the rear wing arm, the rear steerable leg provides a pocket, and the actuator is configured to drive the lock pin into the pocket.

16. The four wheel steering system of claim 15, wherein the actuator is electronically controlled to hydraulically drive the lock pin.

17. The four wheel steering system of claim 16, wherein the lock assembly includes a lock sensor configured to sense the first state corresponding to the lock pin driven into the pocket or the second state corresponding to the lock pin retracted from the pocket.

18. The four wheel steering system of claim 12, wherein the swing arms of the first and second front steering assemblies and the first and second rear steering assemblies are each configured to move by rotating vertically with respect to the chassis.

19. The four wheel steering system of claim 18, wherein the steerable legs of the first and second front steering assemblies and the first and second rear steering assemblies are each configured to move by rotating horizontally with respect to the swing arms.

20. The four wheel steering system of claim 19, wherein ends of the swing arms are each configured as a clevis, and wherein the steerable legs each include a hole for receiving a king pin for fastening the clevis.

* * * * *